Patented Apr. 22, 1924.

1,491,392

UNITED STATES PATENT OFFICE.

WILLIAM T. GRAHAM, OF GREENWICH, CONNECTICUT.

METHOD OF TREATING IRON AND STEEL SCRAP.

No Drawing.    Application filed December 28, 1921.   Serial No. 525,469.

*To all whom it may concern:*

Be it known that I, WILLIAM T. GRAHAM, a citizen of the United States, and a resident of Greenwich, in the county of Fairfield and State of Connecticut, have invented certain new and useful Improvements in Methods of Treating Iron and Steel Scrap; and I do hereby declare the following to be a full, clear, and exact description of the invention, such as will enable others skilled in the art to which it appertains to make and use the same.

The invention relates to a method of treating iron and steel scrap which will lend itself to compression into self-sustaining billets, such as detinned scrap or other light sheet scrap, for the purpose of converting the same into a metal having the outstanding characteristics and properties of wrought iron, which may be rolled into bars, sheets or other shapes, without the necessity of reducing the scrap to molten or pasty condition in the open hearth or puddling furnace as has been the usual practice in reclaiming scrap of this general character which has a large surface in comparison with its volume and is therefore subject to rapid oxidation.

The reclaiming of the scrap in the open hearth process necessitates reducing the scrap to the liquid state, whereas the puddling process which at the present time is used to make iron from steel and other scrap, necessitates reducing the scrap to the pasty state and requires the mixing of iron oxide or similar material with such scrap while in a pasty state.

The present invention is intended to produce from steel scrap a metal having the characteristics and properties of iron very low in carbon without passing this scrap through the pasty or molten state and without mixing the scrap with any iron ore or oxide.

In carrying out my method, the scrap of the character heretofore indicated is assembled in bulk and compressed in the form of blooms or billets preferably having a length considerably in excess of the width or thickness, and of a specific gravity or weight equal to about four-tenths or more of that of a billet of the same size of solid iron or steel. The first condition is necessary in order to permit the compressed scrap being readily handled in the subsequent rolling or compressing operations, which condense the metal into solid form, and admits of the same being rolled or formed into sheets or bars or other commercial shapes. The second condition, namely, the compressing of the scrap into blooms or billets having a specific gravity of about 3.25 or more, which is necessary to the successful application of the method, is due to the fact that, if the scrap is compressed to a less degree, the subsequent heating of the compressed billets will result in excessive oxidation losses and, furthermore, the billets will tend to break apart under the high heat of the furnace or as soon as they are subjected to the final condensing operations in a rolling mill.

The blooms or billets of scrap are placed in a suitable heating furnace, without the addition of iron ore, slag or other elements, and exposed to heat sufficient to bring the material to a welding heat but not sufficient to bring it or any part thereof to a liquid state, the ultimate temperature being between approximately 1700° to 2000° F. By reason of the particular degree of initial compression applied, the blooms or billets are sufficiently coherent to retain their shape during the heating operation, but are not dense enough to prevent the gases in the heating furnace penetrating throughout the compressed material. The consequent result is that the hot furnace gases come into contact with all of the surface elements of the scrap and oxidize the surfaces to $Fe_2O_3$, or to magnetic oxide $Fe_3O_4$, which oxides in turn will oxidize the carbon content of the scrap and also any of the other impurities which may be present in the scrap, leaving the latter in ideal condition for welding or condensing the individual elements of the scrap in a rolling mill, or other suitable apparatus, into a solid bar, sheet or other products. It has been found, for example, that compressed scrap containing .1% carbon when treated by the method indicated may readily be converted into iron products containing less than .05% carbon.

It is practicable and feasible to take the blooms or billets, subjected to the heat treatment as indicated, directly from the furnace to the rolling mill or other condensing apparatus by means of which the material is rolled out or reduced to solid homogeneous forms such as bars, sheets or other shapes. The finished product shows a very good fiber and has the characteristics of low carbon iron. It is easily bent, hot or cold, and is readily welded.

In forming the scrap into bundles or billets, which are coherent and self-sustaining without the use of wires or bands, even at welding temperature, it is necessary only that the compression, by means of a hydraulic press or hammer, be carried out to the extent heretofore indicated, viz, until the bloom or billet has a specific gravity not less than about four-tenths of that of a billet of the same size of solid iron or steel. Some grades of sheet scrap will not lend themselves to such a degree of compression without special preparation, but I have found that scrap of this character may be compressed as readily as the ordinary black scrap or detinned scrap, if it is first treated in an annealing furnace or otherwise heated to a temperature high enough to make it pliable and easily compressible. Furthermore, I have found that an effective and economical form of billet, which will facilitate both the heating and the subsequent condensing operation in a rolling mill, press, or under a hammer, should be at least three times as long as it is high or wide and approximate the blooms or box piles which are ordinarily used in rolling mills.

What I claim is:

1. The method of treating iron and steel scrap, which consists in compressing the scrap sufficiently to produce billets self-sustaining even at welding temperature but pervious to gases, heating the compressed billets to a welding temperature in the presence of a gaseous medium that will materially reduce the carbon content of the scrap, and condensing the heated billets into solid homogeneous form by pressure.

2. The method of treating iron and steel scrap, which consists in compressing the scrap sufficiently to produce billets self-sustaining even at welding temperature but pervious to gases, heating the billets to a welding temperature in the presence of a gaseous medium that will materially reduce the carbon content of the scrap, and condensing the heated billets into solid homogeneous form by rolling or forging.

3. The method of treating iron and steel scrap, which consists in compressing the scrap sufficiently to produce billets self-sustaining even at welding temperature but pervious to gases, heating the compressed billets to a temperature approximately between 1700° and 2000° F. in the presence of a gaseous medium that will materially reduce the carbon content of the scrap, and condensing the heated billets into solid homogeneous form by pressure.

4. The method of treating iron and steel scrap, which consists in compressing the scrap to an extent sufficient to produce a billet having a specific gravity not less than about four-tenths that of a solid billet of the same size, thereby rendering the billet self-sustaining even under welding temperature but pervious to gases, heating the billet to a welding temperature in the presence of a gaseous medium that will materially reduce the carbon content of the scrap, and condensing the heated billets into solid homogeneous form by pressure.

5. The method of treating iron and steel scrap, which consists in heating the scrap sufficiently to render it easily compressible, compressing the same sufficiently to produce billets self-sustaining even at welding temperature but pervious to gases, heating the billets to a welding temperature in the presence of a gaseous medium that will materially reduce the carbon content of the scrap, and condensing the heated billets into solid homogeneous form by pressure.

6. The method of treating steel scrap, which consists in compressing the scrap sufficiently to form billets or blooms which are self-sustaining at ordinary temperature as well as at high welding temperature, heating the compressed billets to a welding temperature in the presence of a gaseous medium that will materially reduce the carbon content of the scrap, and condensing by rolling or other means the heated billets into products showing the characteristic properties of wrought iron, such as fibrous structure, weldability and resistance to corrosion.

In testimony whereof I affix my signature.

WILLIAM T. GRAHAM.